United States Patent [19]

Herrick

[11] 3,884,595
[45] May 20, 1975

[54] IMPELLER AND SHAFT ASSEMBLY
[75] Inventor: David B. Herrick, Connersville, Ind.
[73] Assignee: Dresser Industries, Inc., Dallas, Tex.
[22] Filed: May 15, 1974
[21] Appl. No.: 469,999

[52] U.S. Cl. .................................. 416/198; 416/244
[51] Int. Cl. .............................................. F01d 5/06
[58] Field of Search ...................... 416/244, 244 A; 410/198–201

[56] References Cited
UNITED STATES PATENTS

| | | | |
|---|---|---|---|
| 892,262 | 6/1908 | Jaeger | 416/244 A |
| 1,805,201 | 5/1931 | Birmann | 416/214 A X |
| 2,177,924 | 10/1939 | Buckwalter | 416/244 A |
| 2,441,432 | 5/1948 | McGee | 416/244 A X |
| 2,652,271 | 9/1953 | Gaubatz | 416/244 A X |
| 3,051,372 | 8/1962 | Rockafield et al. | 416/244 X |
| 3,077,334 | 2/1963 | Rubio et al. | 416/244 A |
| 3,228,482 | 1/1966 | Bunyan | 416/244 |

FOREIGN PATENTS OR APPLICATIONS

| | | | |
|---|---|---|---|
| 1,183,804 | 7/1959 | France | 416/244 A |
| 1,285,181 | 1/1962 | France | 416/244 A |

Primary Examiner—Everette A. Powell, Jr.
Attorney, Agent, or Firm—Roy L. Van Winkle; John N. Hazelwood

[57] ABSTRACT

The improved impeller and shaft assembly of this invention is useful in centrifugal compressors or the like. The impeller includes a hub portion that has each end provided with a plurality of radially spaced axially extending slots. As the impeller and shaft come up to speed in the compressor, the centrifugal or outward force generated tends to enlarge the impeller bore due to the mass of the impeller. As the central portion of the hub, which is connected with the disk, cover and vanes and thus has the largest mass, enlarges the slotted portion on each end of the hub is biased inwardly toward the shaft. Thus, as the compressor speed increases, the end portions of the hub are biased into tighter gripping engagement with the shaft preventing radial movement of the impeller relative to the shaft.

6 Claims, 4 Drawing Figures

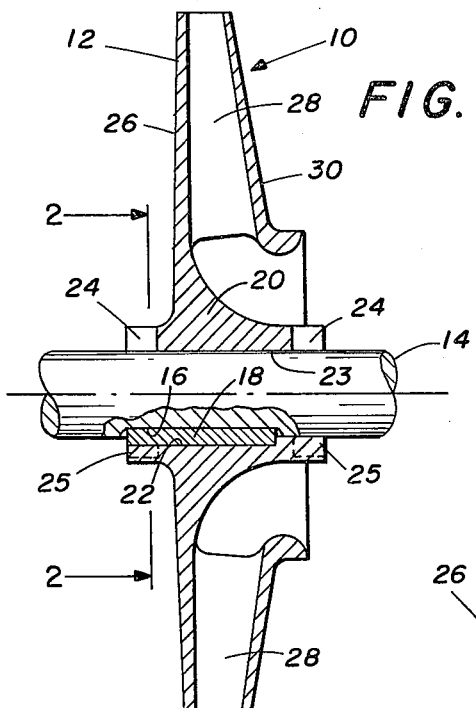
FIG. 1
FIG. 2
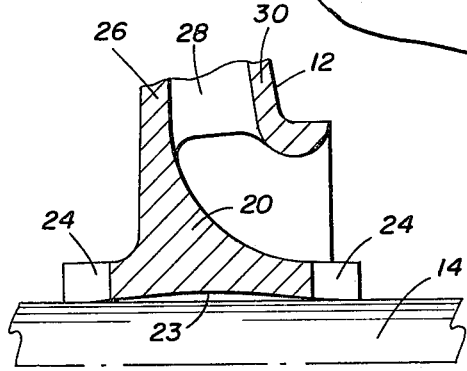
FIG. 3
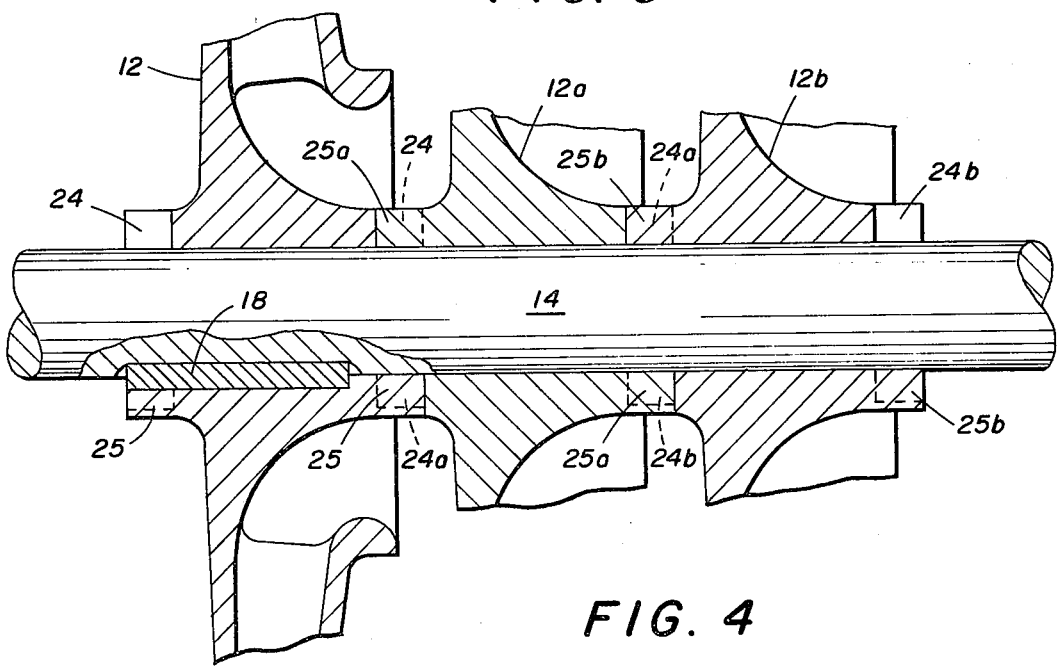
FIG. 4

IMPELLER AND SHAFT ASSEMBLY

BACKGROUND OF THE INVENTION

This invention relates generally to improved impeller and shaft assemblies. More particularly, but not by way of limitation, this invention relates to an improved impeller and shaft assembly for use in centrifugal compressors or the like.

In rotating machinery, where the impeller has a relatively large mass, the centrifugal force generated during rotation of the shaft and impeller tends to enlarge the bore in the impeller loosening it on the shaft. When the apparatus is rotating at high speeds, even relatively small separations between the impeller and the shaft can cause considerable vibration and even destruction of the apparatus.

Various arrangements have been utilized in the past in an attempt to alleviate the loosening of the impeller on the shaft. For example, it has been known to utilize a tapered shaft with a mating tapered bore in the impeller and a threaded locking nut encircling the shaft that is screwed against the impeller to maintain pressure on the impeller biasing it toward the larger diameter of the shaft. Another arrangement has involved placing a tapered bushing in each end of the rotor hub which has a tapered mating surface. The bushings are biased inwardly by threaded fasteners that are screwed into the hub of the impeller to maintain a radial force on the impeller and shaft to prevent the loosening of the impeller on the shaft.

Another approach to prevent loosening of the impeller on the shaft has been to press fit the rotor on the shaft placing a compressive loading on the shaft and hoop tension in the impeller hub. This solution has not been entirely satisfactory since it is oftentimes necessary or desirable to replace the impeller. Replacing the impeller involves forcing the impeller off the shaft and press fitting a new impeller thereon. Facilities for performing this operation are not always available when needed.

Many of the solutions have served the purpose of preventing loosening, but they are usually relatively expensive, some are relatively complex and most occupy more space than is desirable.

The object of this invention is to provide an improved impeller shaft assembly wherein the impeller can be slip fitted onto the shaft and, yet, will not loosen as the shaft and impeller are rotated at high speed. In fact, the impeller will become more tightly engaged with the shaft as the rotational speed increases.

SUMMARY OF THE INVENTION

This invention provides an improved impeller shaft assembly for use in centrifugal compressors or the like comprising an elongated generally cylindrical shaft and impeller located on and rotatable with the shaft. The impeller includes a hub having first and second ends, a bore sized to closely receive the shaft and extending through the ends, a disk portion spaced inwardly from the ends and projecting radially outwardly from the hub, and a plurality of radially spaced slots in the hub extending axially inwardly from the ends of the hub toward the disk portion. The centrifugal or outward force generated by rotation of the assembly tends to enlarge the bore and cause an inwardly directed force on the hub adjacent the slots biasing the slotted portions into tighter gripping engagement with the shaft.

The foregoing and additional objects and advantages of the invention will become more apparent as the following detailed description is read in conjunction with the accompanying drawings wherein like reference characters denote like parts in all views.

BRIEF DESCRIPTION OF THE DRAWINGS

FIG. 1 is a cross-sectional view of an impeller and shaft assembly constructed in accordance with the invention.

FIG. 2 is a partial, cross-secitonal view taken along the line 2—2 of FIG. 1.

FIG. 3 is a cross-sectional view of a portion of the impeller and shaft assembly of FIG. 1 in operation.

FIG. 4 is a partial, cross-sectional view illustrating a further embodiment of impeller and shaft assembly that is also constructed in accordance with the invention.

DETAILED DESCRIPTION OF THE PREFERRED EMBODIMENT

Referring to the drawings, and FIG. 1 in particular, shown therein and generally designated by the reference character 10 is an impeller and shaft assembly that is constructed in accordance with the invention. The impeller and shaft assembly 10 includes an impeller 12 that is located on and rotatable with a shaft 14. The impeller and shaft assembly 10 is to be located in a centrifugal compressor (not shown) with the shaft 14 journaled therein to provide for rotation of the assembly 10.

As illustrated in FIG. 1, a shaft 14 is provided with a keyway 16 that is sized to receive a key 18. A hub portion 20 of the impeller 12 is provided with a keyway 22 that is also sized to receive the key 18. The keyway 22 is arranged in alignment with the keyway 16 in the shaft 14 so that the impeller 12 and the shaft 14 rotate as a unit.

As will be appreciated, the keyway 22 is formed adjacent a bore 23 that extends through the ends of the impeller 12. The bore 23 is sized to slidingly receive the shaft 14. As will become apparent hereinafter, it is not necessary for the hub 20 to tightly engage the shaft 14 during assembly.

Each end of the hub 20 is provided with a plurality of radially spaced slots 24 forming spaced lands 25 as may be more clearly seen in FIG. 2. The slots 24 extend inwardly from each end of the hub 20. If only a single impeller 12 is to be used in the centrifugal compressor, the exact size and spacing of the slots 24 is not critical. However, when a plurality of impellers are to be positioned on the shaft 14, the slot arrangement is more restricted and will be described more fully in connection with the description of FIG. 4.

The impeller 12 also includes a disk portion 26 that projects radially outwardly from the hub 20, a plurality of spaced vanes or blades 28, and a cover 30. The disk 26, vanes 28 and cover 30 are generally welded, cast or riveted together to form a unit.

With the impeller 12 assembled on the shaft 14, the shaft and impeller assembly 10 is rotated at high speed in the compressor (not shown). The centrifugal force developed during rotation is greatest on the largest mass of the impeller 12. As can be appreciated from viewing FIG. 1, the largest mass is composed of the disk 26, vanes 28 and the cover 30 all of which are connected to the hub 20. Due to the concentration of mass, the hub 20 will distort as illustrated in FIG. 3. That is, the bore 23 will, due to the centrifugal force of the mass, tend to enlarge as illustrated and separate slightly from the shaft 14.

As the separation occurs, the slotted ends of the hub 20 are biased inwardly and press against the exterior of the shaft 14. Thus, the higher the rotative speed and the higher the centrifugal force, the greater the gripping force exerted on the shaft 14 by the slotted ends of the hub 20. Since the impeller 12 is gripping the shaft 14 tightly, the impeller 12 will not move radially with respect to the shaft 14 and thus will not contribute to vibration in the compressors.

DETAILED DESCRIPTION OF THE EMBODIMENT OF FIG. 4

In FIG. 4, the impeller 12 is located on the shaft 14 as previously described in connection with FIG. 1. That is, the impeller 12 is located on the shaft 14 with the key 18 in place preventing relative rotation between the impeller 12 and the shaft 14. The slots 24 and the lands 25 therebetween on the hub 20 of the impeller 12 are to be substantially identical in size.

Due to the configuration of the lands 25 and the slots 24, a substantially identical impeller 12a may be positioned on the shaft 14 with slots 24a therein receiving the lands 25 on the impeller 12 so that the impellers 12 and 12a are in mesh and will rotate together. Thus, it is not necessary to key or otherwise affix the impeller 12a to the shaft 14.

Similarly, an impeller 12b, which may be identical to the impellers 12 and 12a, but one that at least includes slots 24b providing lands 25b which mesh with the lands 25a and slots 24a on the impeller 12a is positioned on the shaft 14. The arrangement is such that the impeller 12b meshes with the impeller 12a so that no relative rotation occurs therebetween. Thus, the impeller and shaft assembly described in FIG. 4 provides a multiple impeller and shaft assembly wherein the impellers will not loosen on the shaft during rotation and will not rotate relative to the shaft due to the insertion of a key or other suitable means of fixing one of the impellers to the shaft.

Most importantly, each impeller 12, 12a and 12b is provided with the slotted hub arrangement. Each impeller will independently grip the shaft 14 during rotation despite the growth of the bore to avoid radial movement of the impellers relative to the shaft.

It has been mentioned that the impellers 12, 12a and 12b are identical or substantially identical. It will be understood, of course, that the only identity required is in the meshing of the lands and the slots which function to interconnect the rotors preventing relative rotation therebetween. The impellers, that is the disks, vanes and the cover may be of different sizes to provide a multi-stage device.

From the foregoing, it will be appreciated that the impeller and shaft assemblies described provide a simple, yet effective, means for preventing radial movement of the impeller relative to the shaft during rotation. While the impeller will not loosen on the shaft, it is possible, since the bore of the impeller is in sliding fit with the shaft, to simply slip the impeller over the shaft, during assembly and diassembly. Thus, the necessity for press fits, or other complicated means for preventing loosening of the impeller on the shaft is avoided.

It will also be appreciated that the preceding detailed description is presented by way of example only and many changes and modifications can be made thereto without departing from the spirit and scope of the invention.

The embodiments of an invention in which an exclusive property or privilege is claimed are defined as follows:

1. An improved impeller and shaft assembly for use in centrifugal compressors or the like comprising:
    an elongated, generally cylindrical shaft; and,
    an impeller located on and rotatable with said shaft, said impeller including a hub portion having first and second ends, a bore sized to closely receive said shaft and extending through said ends, a disk portion spaced axially inwardly from said ends and projecting radially outwardly from said hub portion, and a plurality of radially spaced slots in said hub portion extending axially inwardly from said ends toward said disk portion whereby the centrifugal or outward radial force generated by rotation of said assembly, which tends to enlarge said bore, causes a radially inwardly directed force on said hub portion adjacent said slots biasing said slotted end portions into tighter gripping engagement with said shaft.

2. The improved impeller and shaft assembly of claim 1 and also including means engaging said shaft and impeller for preventing relative rotation therebetween.

3. The improved assembly of claim 2 wherein said means includes:
    radially aligned slots in the hub portion of said impeller adjacent said bore and in said shaft; and,
    a key member disposed in said aligned slots in engagement with said impeller and shaft.

4. The improved assembly of claim 1 and also including a second impeller located on and rotatable with said shaft adjacent said first mentioned impeller, said second impeller having first and second ends, a bore sized to closely receive said shaft and extending through said ends, a disk portion projecting radially outwardly from said hub portion and spaced axially inwardly from said ends, and a plurality of radially spaced slots in said hub portion extending axially inwardly from said ends toward said disk portion whereby the centrifugal or outward radial force generated by rotation of said assembly, which tends to enlarge said bore, causes a radially inwardly directed force on said hub portion adjacent said slots gripping said shaft, the slotted first end on said second rotor being in mesh with the slotted second end on said first mentioned rotor whereby said rotors rotate as a unit.

5. The improved assembly of claim 4 and also including means engaging said shaft and at least one of said rotors for preventing relative rotation between said shaft and rotors.

6. The improved assembly of claim 5 wherein said means includes:
    radially aligned slots in said shaft and in the hub portion of said first mentioned rotor adjacent said bore; and,
    a key member disposed in said aligned slots in engagement with said shaft and first mentioned rotor.

* * * * *